Figure 1:
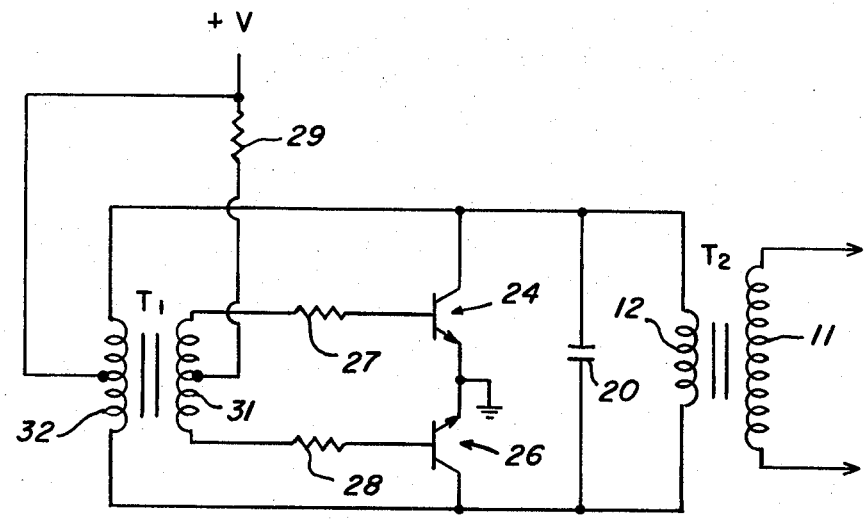

United States Patent [19]
Parson

[11] 3,863,180
[45] Jan. 28, 1975

[54] HIGH VOLTAGE GENERATOR
[75] Inventor: Ronald F. Parson, St. Paul, Minn.
[73] Assignee: Graco Inc., Minneapolis, Minn.
[22] Filed: Dec. 11, 1973
[21] Appl. No.: 423,874

[52] U.S. Cl. .......................... 331/117 R, 331/113 A
[51] Int. Cl. ............................................. H03b 5/00
[58] Field of Search ............ 331/113 R, 113 A, 114, 331/117 R, 111; 321/2, 15, 45 R; 317/3; 330/15

[56] References Cited
UNITED STATES PATENTS

| | | | |
|---|---|---|---|
| 3,026,486 | 3/1962 | Pintell | 331/113 A |
| 3,299,371 | 1/1967 | Ryan | 331/114 |
| 3,315,178 | 4/1967 | Chernish | 331/117 |
| 3,350,661 | 10/1967 | Bloom et al. | 331/113 A |
| 3,731,145 | 5/1973 | Senay | 321/15 |

FOREIGN PATENTS OR APPLICATIONS

| 129,677 | 6/1960 | U.S.S.R. | 321/2 |
|---|---|---|---|

Primary Examiner—William H. Beha, Jr.
Attorney, Agent, or Firm—Paul L. Sjoquist

[57] ABSTRACT

Electronic circuit apparatus for generating a high voltage, alternating current power supply from a low voltage, direct current source is described, wherein the circuit includes a pair of semiconductor devices driving a tuned transformer load and being driven by a second transformer feedback network.

9 Claims, 2 Drawing Figures

HIGH VOLTAGE GENERATOR

This invention relates to an electronic power conversion apparatus, and more particularly to an oscillator for generating a fixed-frequency high voltage signal, for feeding into suitable voltage multiplier apparatus and thereby creating a high voltage, low current DC power supply.

The voltage conversion of this invention is accomplished generally from a low voltage DC source which is converted into an oscillating frequency and stepped up through a transformer and associated circuitry. While the conversion from a low voltage DC supply into a high voltage oscillating frequency is generally known in the prior art, the present invention incorporates novel circuitry for the accomplishment of this result. The invention is intended for use in conjunction with any of a number of well-known circuits capable of voltage multiplication, and which may receive a relatively high voltage frequency such as provided by the present invention and rectify same while increasing the voltage magnitude thereof. The invention accomplishes its intended functions through the use of only two transistors in conjunction with an inverter transformer providing the necessary positive feedback for creating oscillation. The transistor's output frequency is coupled into the primary winding of a step-up transformer, which transformer also has a parallel capacitance across its primary for creating a resonant circuit. The resonating alternating voltage created thereby is stepped up through the transformer to provide a suitable high voltage alternating source, which may be sinusoidal, square wave, or have other wave forms, for driving voltage multiplier circuits as herein described.

Examples of the voltage multiplier circuits which can typically be used with the invention may be found in U.S. Pat. No. 3,273,015, issued Sept. 13, 1966, and in any technical reference work relating to capacitor-diode voltage doubler circuits. Circuits of this type have existed in the prior art for many years and, while usable in conjunction with the invention, do not form a part thereof.

The invention is particularly useful in the design of a high voltage power supply for use with electrostatic paint spraying equipment. In equipment of this type, a paint spray gun has associated therewith an electrode for ionizing the paint particles as they are projected from the spray gun to the target to be painted. This high voltage electrode is connected via suitable cables to a high voltage power supply. The high voltage power supply is typically remotely located, although in some cases may be miniaturized to the extent of enabling it to be packaged within the spray gun body. Alternatively, the high voltage power supply may be segmented, with a portion of the supply packaged within the spray gun body and the remaining high voltage power supply portion located remotely from the spray gun. The present invention is usable with any of these packaging schemes, its extremely simple circuit being conducive to miniaturization and high density packaging.

The primary object of the invention is to provide a simple high voltage oscillating circuit for use in conjunction with a high voltage power supply. Another object of the invention is to provide a high voltage oscillating circuit which may be operated from a low voltage DC power source, and which is adaptable for connecting to suitable voltage multiplying apparatus. A further object of the invention is to provide an economical and simple high voltage power supply for use with an electrostatic paint spraying system.

Figure 2:
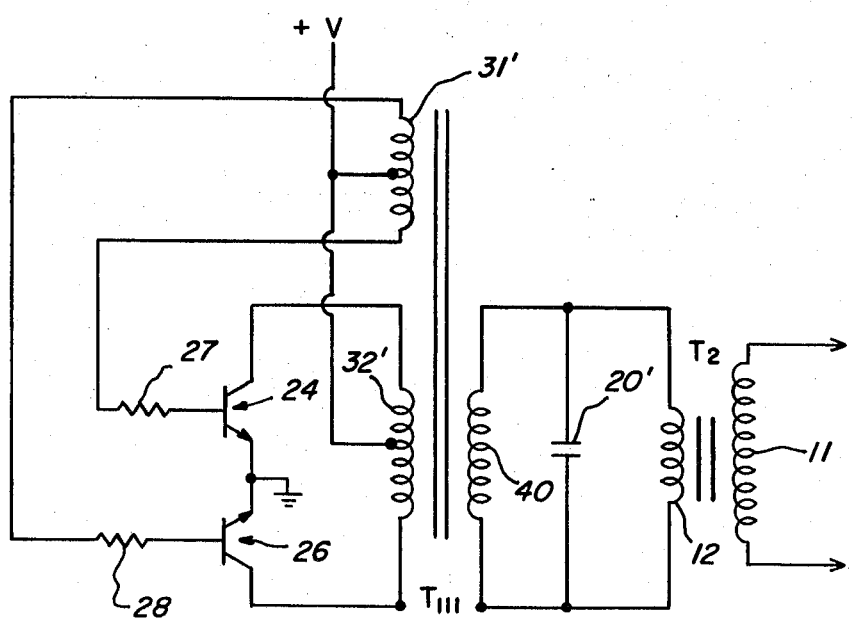

These and other objects and advantages of the invention will become apparent from the following detailed description and claims, taken in conjunction with the drawings which illustrate the preferred inventive embodiment, wherein:

FIG. 1 is a schematic of the invention showing a transformer feedback circuit; and FIG. 2 is a schematic of the invention showing an alternative transformer circuit.

Referring first to FIG. 1, the invention is shown in a preferred embodiment. Transformer $T_2$ is a typical high voltage step-up transformer, with its secondary winding 11 having a great many more turns than its primary winding 12. For example, a commercial transformer manufactured by Andover Inc., Part No. 40 AC 4651, has been found to be suitable for this use in the invention. This transformer generates approximately 5,000 volts peak across its secondary winding 11 when an input signal of 60 volts peak is provided across primary winding 12 at a frequency of 3,000 Hertz ($H_z$). Of course, the output voltage may be rectified and multiplied using any of a number of well-known voltage multiplier circuits available for this purpose. Capacitor 20 is connected across the primary winding 12 of $T_2$, and serves to create a resonant circuit wherein the primary winding 12 forms a part. The value of capacitor 20 is determined by the operating frequency, the other circuit elements loading the primary 12, and the electrical characteristics of transformer $T_2$. In practice, capacitor 20 has been sized in the range of 1.5–2 microfarads, at a voltage rating of 400 volts.

Transistors 24 and 26 are commercially available power transistors. Transistor types 2N3054 or 2N3055, or any reasonably available equivalent, have been found satisfactory for use in the circuit. Transistors 24 and 26 have their respective emitters connected together and to a suitable ground. Their collectors are connected to respective different ends of winding 12 and capacitor 20. The base element of transistor 24 is connected to a current-limiting resistor 27; the base element of transistor 26 is connected to a current-limiting resistor 28. Resistors 27 and 28 may have values in the range 0 to several hundred ohms, with typical operating values of 30 ohms. The other ends of the resistors 27 and 28 are connected to a transformer winding 31, which forms a drive signal input means for the transistors. Winding 31 is illustrated as a secondary winding on transformer $T_1$, although if a typical inverter transformer is used, such as a transformer manufactured by Pulse Engineering Inc., San Diego, Calif., Model 6194 or 6195, winding 31 may be the winding designated as a second primary or feedback winding. The first primary winding 32 operates in conjunction with winding 31 and the remaining circuitry to create an alternating drive signal into the transistors 24 and 26. Functionally, transformer $T_1$ operates as a saturable core, low power transformer.

The center tap of winding 31 is connected to one end of a current-limiting resistor 29. This resistor may typically have a value of from 10 to 1,000 ohms or higher. The other end of resistor 29, and also the center tap of winding 32, is connected to a source of positive voltage, typically 13–15 volts D.C. The ends of primary winding 32 are also connected to the respective collectors of transistors 24 and 26, and to capacitor 20 and primary winding 12.

FIG. 2 illustrates an alternative embodiment of the invention wherein a transformer having two primary windings, such as the Pulse Engineering Inc. transformer Model 6190 or 6191, is shown. The primary windings of this transformer are winding 31' and 32', with winding 31' being used in a feedback circuit to drive the base elements of transistors 24 and 25. Both windings 31' and 32' have a centertap connection which is wired to a positive polarity low voltage D.C. source.

The secondary winding 40 of transformer $T_{111}$ has a turns ratio of approximately unity, relative to winding 32', but this turns ratio is not critical to the operation of the invention if the other circuit elements are properly chosen. It is important only to match the output impedance of transformer $T_{111}$ to the input impedance of transformer $T_2$. If correct impedance matching is accomplished, with the other circuit parameters described herein, the value chosen for capacitor 20' may be in the range 1–10 microfarads.

The circuit of FIG. 2 operates in a manner very similar to that of FIG. 1, the difference essentially being the insertion of additional transformer coupling in the circuit of FIG. 2 by using secondary winding 40 to drive the high voltage transformer $T_2$. This difference involves only the additional problem of impedance matching as hereinbefore described. The operation of the novel circuit will be described with reference to FIG. 1, it being understood that the circuit of FIG. 2 operates in a similar manner.

In operation, an oscillating drive frequency is generated across winding 31 to alternately turn on transistors 24 and 26. As these transistors conduct they generate an alternating frequency through primary winding 12 at a frequency value determined by capacitor 20 and the other circuit elements. This alternating signal is amplified through transformer $T_2$ and presented across winding 11 at a stepped-up voltage value. As hereinbefore described, this stepped-up voltage frequency is typically coupled to a voltage multiplier circuit and rectifier for use in developing a high voltage for electrostatic spray guns.

Assuming initially that transistor 24 is in a conducting state and transistor 26 is non-conducting, there is a heavy current flow through the top portion of transformer $T_1$ winding 32. This current flow causes an induced voltage across the top portion of secondary winding 31 and develops a base drive current through resistor 27 to maintain transistor 24 in the conducting state. The voltage at the collector electrode of transistor 24 is nearly at ground potential, while the voltage at the collector electrode of transistor 26 is nearly at the +V potential. This voltage differential is developed across transformer $T_2$ primary winding 12 and stepped up to a higher voltage level across secondary winding 11.

At some point the transformer $T_1$ core saturates and no further voltage is induced across the upper portion of winding 31. This removes the base drive current to transistor 24 and causes transistor 24 to begin to shut off. As the conduction of current through transistor 24 becomes lessened, the voltage at its collector electrode goes positive. Since this positive-going voltage is also connected to the primary winding 32 of transformer $T_1$, it brings the transformer core out of saturation and induces a voltage across secondary 31 of an opposite polarity, thereby causing a base drive current to be generated through resistor 28 for transistor 26. This base drive current causes transistor 26 to begin conducting, drawing current through the bottom portion of primary winding 32 and further enhancing the base drive current to transistor 26. As a result, transistor 26 rapidly goes into conduction, and transistor 24 as rapidly cuts off, reversing the voltage polarity across transformer $T_2$ primary winding 12. This reversed voltage is stepped up across transformer $T_2$ and developed as a high voltage across secondary winding 11. When the transformer $T_1$ core again saturates, the base drive voltage across the lower portion of winding 31 collapses and removes the base drive to transistor 26. Transistor 26 begins cutting off and the reversal of voltage described above again takes place to cause transistor 24 to begin conduction.

The frequency at which the current reversals occur is determined to a large extent by the value of capacitor 20. This capacitor is wired across primary winding 12 and the transistor drive circuit herein described. Capacitor 20 and primary winding 12 act together as a resonant circuit and thereby assist the current reversals in a manner which consumes a minimal amount of power. The output voltage across secondary winding 11 is therefore an alternating voltage at the frequency determined by the values of these circuit components; a preferred operating circuit is achieved using the values described herein, although variations in these values will also provide satisfactory results with the novel circuit.

I claim:

1. Apparatus for generating an alternating current high voltage to a load from a direct current low voltage supply having two voltage terminals, comprising a transformer having its secondary winding connected across said load and having a primary winding; two series opposing semiconductor switches connected across said primary winding, with the common junction point of said semiconductor switches connected to a first terminal of said low voltage supply, each of said semiconductor switches having a control element for regulating the respective current conduction through said switches; a current drive transformer winding connected between respective control elements of said conductive switches and having a center tap connection connected to the second terminal of said low voltage supply; means for coupling voltage from said second terminal of said low voltage supply to said primary winding and to said series opposing semiconductor switches; means for electrically coupling said current drive transformer winding to said transformer primary winding, whereby the alternating current drive energy for said semiconductor switch control element is derived from said primary winding; and a capacitor connected in parallel connection across said transformer.

2. Apparatus as claimed in claim 1 wherein said current drive winding further comprises a current saturable magnetic core in magnetic coupling relationship to said winding.

3. Apparatus as claimed in claim 2 further comprising a current limiting resistor connected in series relation between said second low voltage supply terminal and the center tap of said current drive transformer winding connected to the control elements.

4. Apparatus as claimed in claim 3 wherein said series opposing semiconductor switches further comprise transistors.

5. Apparatus for generating an alternating current voltage to a load from a two-terminal direct current supply, comprising:
- a transformer having a secondary winding connected to said load, and having a first and second primary winding, each with a centertap connection;
- means for connecting said first and second primary winding centertaps to a first terminal of said direct current supply;
- a pair of series opposing semiconductor devices connected across said first primary winding, each of said devices having a control element for controlling current conducted therethrough;
- means for connecting the common connection of said devices to a second terminal of said direct current supply;
- means for connecting each of said device control elements to respective ends of said second primary winding; and
- a capacitor connected in parallel connection across said secondary winding.

6. Apparatus as claimed in claim 5 wherein the impedance of said transformer secondary winding is substantially equal to the impedance of said load.

7. Apparatus as claimed in claim 6, further comprising a current-limiting resistance connected in series arrangement with each of said semiconductor device control elements and said means for connecting said control elements to said second primary winding.

8. Apparatus as claimed in claim 7 wherein said transformer further comprises a current saturable magnetic core.

9. Apparatus as claimed in claim 8 wherein said semiconductor devices further comprise transistors, and said control elements comprise transistor base junctions.

* * * * *